(12) United States Patent
Wolter et al.

(10) Patent No.: US 9,306,624 B1
(45) Date of Patent: Apr. 5, 2016

(54) INITIALIZATION OF ENDPOINT DEVICES JOINING A POWER-LINE COMMUNICATION NETWORK

(71) Applicant: Landis+Gyr Technologies, LLC, Pequot Lakes, MN (US)

(72) Inventors: Chad K. Wolter, Breezy Point, MN (US); Bryce D. Johnson, Crosslake, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

(21) Appl. No.: 14/675,244

(22) Filed: Mar. 31, 2015

(51) Int. Cl.
| H04B 3/00 | (2006.01) |
| H04L 25/00 | (2006.01) |
| H04B 3/54 | (2006.01) |
| H02J 3/00 | (2006.01) |

(52) U.S. Cl.
CPC .... H04B 3/54 (2013.01); H02J 3/00 (2013.01)

(58) Field of Classification Search
CPC .......... H04B 3/54; H02J 3/00; H04L 7/0091; H04L 49/253; H04L 12/66; H04L 12/6418; H04L 47/321
USPC ........... 375/257, 259; 455/402; 370/345, 235; 379/227, 219
See application file for complete search history.

(56) References Cited

U.S. PATENT DOCUMENTS

| 5,581,229 A | 12/1996 | Hunt |
| 6,154,488 A | 11/2000 | Hunt |
| 6,177,884 B1 | 1/2001 | Hunt et al. |
| 6,998,963 B2 | 2/2006 | Flen et al. |
| 7,102,490 B2 | 9/2006 | Flen et al. |
| 7,145,438 B2 | 12/2006 | Flen et al. |
| 7,180,412 B2 | 2/2007 | Bonicatto et al. |
| 7,184,861 B2 | 2/2007 | Petite |
| 7,209,840 B2 | 4/2007 | Petite et al. |
| 7,224,740 B2 | 5/2007 | Hunt |
| 7,236,765 B2 | 6/2007 | Bonicatto et al. |
| 7,346,463 B2 | 3/2008 | Petite et al. |
| 7,432,824 B2 | 10/2008 | Flen et al. |
| 7,443,313 B2 | 10/2008 | Davis et al. |

(Continued)

OTHER PUBLICATIONS

RFC 6550—"RPL: IPv6 Routing Protocol for Low-Power and Lossy Networks;" Mar. 2012.

(Continued)

*Primary Examiner* — Phuong Phu
(74) *Attorney, Agent, or Firm* — Crawford Maunu PLLC

(57) ABSTRACT

In one or more embodiments, an apparatus includes a first power-line communication circuit to communicate data with a second power-line communication circuit over power lines and using a communication protocol requiring that one of the first power-line communication circuit or the second power-line communication circuit join into regular communications in response to an initiation message received over the power lines. The first power-line communication circuit communicates data regularly with the second power-line communication circuit over the power lines after being joined into regular communications by an initiation message received over the power lines, the initiation message being communicated over the power lines at an initiation time interval, the initiation time interval being based on a random interval that is within an interval range and that is based on a relative time at which at least two of the plurality of endpoint devices are designated to join within an interval range.

20 Claims, 5 Drawing Sheets

(56) References Cited

U.S. PATENT DOCUMENTS

| | | |
|---|---|---|
| 7,468,661 B2 | 12/2008 | Petite et al. |
| 7,706,320 B2 | 4/2010 | Davis et al. |
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |
| 7,978,059 B2 | 7/2011 | Petite et al. |
| 8,144,816 B2 | 3/2012 | Bonicatto et al. |
| 8,144,820 B2 | 3/2012 | Bonicatto |
| 8,170,081 B2 | 5/2012 | Forenza et al. |
| 8,194,789 B2 | 6/2012 | Wolter et al. |
| 8,213,398 B2 | 7/2012 | Geile et al. |
| 8,238,263 B2 | 8/2012 | Kohout et al. |
| 8,700,187 B2 * | 4/2014 | Forbes, Jr. ............ G01D 4/004 323/299 |
| 8,750,395 B1 * | 6/2014 | Woodruff ................ H04B 3/54 375/259 |
| 8,855,279 B2 * | 10/2014 | Forbes, Jr. ............. G06Q 10/00 379/1.03 |
| 2002/0141523 A1 | 10/2002 | Litwin, Jr. et al. |
| 2003/0115391 A1 | 6/2003 | Ajanovic et al. |
| 2004/0001440 A1 * | 1/2004 | Kostoff .................. H04L 47/32 370/235 |
| 2004/0160990 A1 | 8/2004 | Logvinov et al. |
| 2004/0208158 A1 * | 10/2004 | Fellman ............. H04L 12/6418 370/345 |
| 2005/0177853 A1 * | 8/2005 | Williams ........... H04N 21/2181 725/81 |
| 2007/0002772 A1 | 1/2007 | Berkman et al. |
| 2007/0135085 A1 * | 6/2007 | Iwamura ................ H04B 3/54 455/402 |
| 2007/0222579 A1 | 9/2007 | Berkman |
| 2008/0304595 A1 | 12/2008 | Haug et al. |
| 2008/0310457 A1 | 12/2008 | Yamashita et al. |
| 2009/0161774 A1 | 6/2009 | Liu et al. |
| 2009/0198795 A1 * | 8/2009 | Binder ................... H04L 12/66 709/219 |
| 2009/0299532 A1 | 12/2009 | Zyren |
| 2009/0316766 A1 | 12/2009 | Korobkov et al. |
| 2010/0021166 A1 | 1/2010 | Way |
| 2010/0164615 A1 | 7/2010 | Bonicatto |
| 2010/0238815 A1 | 9/2010 | Kohout et al. |
| 2010/0316140 A1 | 12/2010 | Razazian et al. |
| 2011/0121952 A1 | 5/2011 | Bonicatto et al. |
| 2011/0142108 A1 | 6/2011 | Agee et al. |
| 2011/0176598 A1 | 7/2011 | Kohout et al. |
| 2011/0218686 A1 | 9/2011 | McHann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0076228 A1 | 3/2012 | Wu et al. |
| 2012/0084559 A1 | 4/2012 | Bonicatto |
| 2012/0106664 A1 | 5/2012 | Bonicatto et al. |
| 2013/0142231 A1 | 6/2013 | Schwager et al. |
| 2013/0163681 A1 * | 6/2013 | Wolter .................. H04L 7/0091 375/257 |
| 2014/0064387 A1 | 3/2014 | Bonicatto et al. |
| 2015/0052255 A1 * | 2/2015 | Sun ...................... H04L 49/253 709/227 |

OTHER PUBLICATIONS

IEEE 802.15.4-2006—"Part 15.4: Wireless Medium Access Control (MAC) and Physical Layer (PHY) Specifications for Low-Rate Wireless Personal Area Networks (WPANs);" 2006.

ITU-T G.9903—"Narrowband orthogonal frequency division multiplexing power line communication transceivers for G3-PLC networks;" Oct. 2012.

\* cited by examiner

INITIALIZATION OF ENDPOINT DEVICES JOINING A POWER-LINE COMMUNICATION NETWORK

FIELD

Aspects of various embodiments are directed to initialization of endpoint devices joining a power-line communication network.

BACKGROUND

The electrical grid delivers electrical power to consumers using an interconnected power network. Power stations/plants produce electricity from a number of different power sources including, but not limited to, combustible fuels, nuclear fission, water, solar energy and wind. Utility power lines deliver the electricity from the power stations to a consumer's premises (e.g., customers of the power supply provider), which include residential and commercial buildings. Long distance transmission can be carried out using high voltage alternating current (AC) (e.g., on order of hundreds of kilovolts), which is useful for reducing energy loss. Substations include transformers for reducing the voltage (e.g., under 10,000 volts or under 13,200 volts) for subsequent delivery to a local area. The voltage can be further reduced (e.g., down to 120-280 volts) using a local transformer, sometimes referred to as a transformer drum/can for its traditional drum-like shape or as a pad mount, for delivery to a consumer's premises. For example, in residential circumstances, the voltage can be further reduced down to 240 volts using a local transformer.

Service providers are dependent on proper operation of their respective networks to deliver services to the customers. Often, it can be desirable or necessary to ascertain information regarding the services that are provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication (PLC) networks, endpoint devices in the network (e.g., meters, load control switches, remote service switches, and other endpoints) can provide updated information (e.g., power consumption information and/or endpoint operating status information) by transmitting data over power lines that also carry alternating current. However, digital communication over noisy channels (e.g., over power lines and wireless mediums) poses a challenge to reliable, efficient, error-free data transfer between a transmitter and receiver. The amount of data that can be transmitted at the same time is limited, not allowing for a large number of endpoint devices to join in a reasonable period of time. This causes delays in network formation time and impedes stability.

These and other matters have presented challenges to power line communication networks, for a variety of applications.

SUMMARY

Aspects of the present disclosure are directed to network applications for initialization of endpoint devices for joining a power-line communication network, and that are applicable to a variety of applications, devices, systems and methods. One or more embodiments provide for transmission of data symbols with varying criteria for network-joining endpoint devices being based at least in part on randomly-prescribed times.

According to a number of example embodiments, an apparatus includes a first power-line communication circuit configured and arranged to communicate data with a second power-line communication circuit over power lines of a power-line communication (PLC) network and using a communication protocol requiring that one of the first power-line communication circuit or the second power-line communication circuit join into regular communications in response to an initiation message being recognized as received over the power lines of the PLC network. The first power-line communication circuit being further configured and arranged to communicate data regularly with the second power-line communication circuit over the power lines after being joined into regular communications by an initiation message being recognized as received over the power lines of the PLC network, the initiation message being communicated over the power lines at an initiation time interval, the initiation time interval being based on a random interval that is within an interval range and that is based on a relative time at which at least two of the plurality of endpoint devices are designated to join within the interval range. The communicated data includes power-meter data collected by at least one of a plurality of endpoint devices.

Certain embodiments are directed to an apparatus including a first power-line communication circuit configured and arranged to communicate data with a second power-line communication circuit over power lines of a PLC network and using a communication protocol requiring that one of the first power-line communication circuit or the second power-line communication circuit join into regular communications in response to an initiation message being recognized as received over the power lines of the PLC network. The communicated data includes power-meter data collected by at least one of a plurality of endpoint devices. The first power-line communication circuit being further configured and arranged to provide an initiation time interval for an endpoint device, the initiation time interval being based on a random interval within an interval range, and at each of a plurality of message time intervals wherein each is less than the interval range, check for an initiation message received over the PLC network and from another endpoint device. Further, the first power-line communication circuit is configured and arranged to, in response to the received initiation message, use another initiation time interval that is greater than the provided initiation time interval and based on a time at which the initiation message is received, and transmit, in response to expiration of the another initiation time interval and over the PLC network, a communication to a collector device. The collector device is configured and arranged to use the communication as an initiation request for joining the endpoint device to the PLC network.

In accordance with various embodiments, the first power-line communication circuit is one of the plurality of endpoint devices. Alternatively, the first power-line communication circuit is the collector device including communication circuitry and the second power-line communication circuit is configured and arranged as one of the plurality of endpoint devices.

In various embodiments, an endpoint device is configured to provide power-meter reports over a power-line communication network by transmitting data symbols over a power line using a data communication channel (e.g., a transmission channel). The endpoint device includes a metering circuit, a communication circuit, and a processing circuit. The metering circuit is configured to receive power-meter data for utility-supplied alternating current (AC) power that is provided over the power line that is part of the power-line communication network. The communication circuit is configured to transmit the power-meter data over the power line and the power-line communication network. The processing circuit is configured to initialize the endpoint device with the power-line communication network by determining an initiation time interval associated with the endpoint device, detecting, prior to the end of the initiation time interval, an initiation request from another endpoint device, adding, in response to detecting the initiation request from the another endpoint device, time to the initiation time interval, detecting the expiration of the initiation time interval, and transmitting, in response to detecting the expiration of the initiation time interval, an initiation request.

Certain embodiments are directed to a collector device and a plurality of endpoint devices. The collector device includes communication circuitry configured to communicate with the plurality of endpoint devices over power lines that are part of the PLC network. Further, the collector device is configured to communicate with a command center over a utility power line that is part of the power-line communication network. Each of the plurality of endpoint devices are configured to provide power-meter reports over a power-line communication network by transmitting data symbols over a power line using a data communication channel.

Various embodiments are directed to a method for initializing an endpoint device with a PLC network, the endpoint device is configured and arranged to provide power-meter reports over the PLC by transmitting data symbols over power lines using a data communication channel. The method includes providing an initiation time interval, the initiation time interval being based on a random interval within an interval range, and, at each of a plurality of message time intervals wherein each is less than the interval range, checking for an initiation message received over the PLC network and from another endpoint device. Further, the example method embodiment includes, in response to the received initiation message, using another initiation time interval that is greater than the provided initiation time interval and based on a time at which the initiation message is received, and transmitting, in response to expiration of the initiation time interval and over the PLC network, a communication to a collector device. The collector device is configured to use the communication as an initiation request for joining the endpoint device in communication with other endpoint devices over the power lines.

In some embodiments, the method can further include joining each of the endpoint devices to the PLC network using initiation data received by the endpoint device from the collector device, the initiation data sent in response to the initiation request, and wherein transmitting the initiation request to the collector device includes the endpoint device transmitting the initiation request to a different endpoint device. The method further includes the different endpoint device routing the initiation request to the collector device using the power lines.

As is more generally applicable to some other applications, in some embodiments, a system includes one or more endpoints configured to transmit data over various transmission mediums (e.g., copper wire, fiber optics, wireless).

The above discussion/summary is not intended to describe each embodiment or every implementation of the present disclosure. These and other aspects of the present disclosure are exemplified in a number of implementations and applications, some of which are described in the accompanying drawings and the description below.

BRIEF DESCRIPTION OF THE FIGURES

Various example embodiments may be more completely understood in consideration of the following detailed description in connection with the accompanying drawings, in which.

Figure 1A:
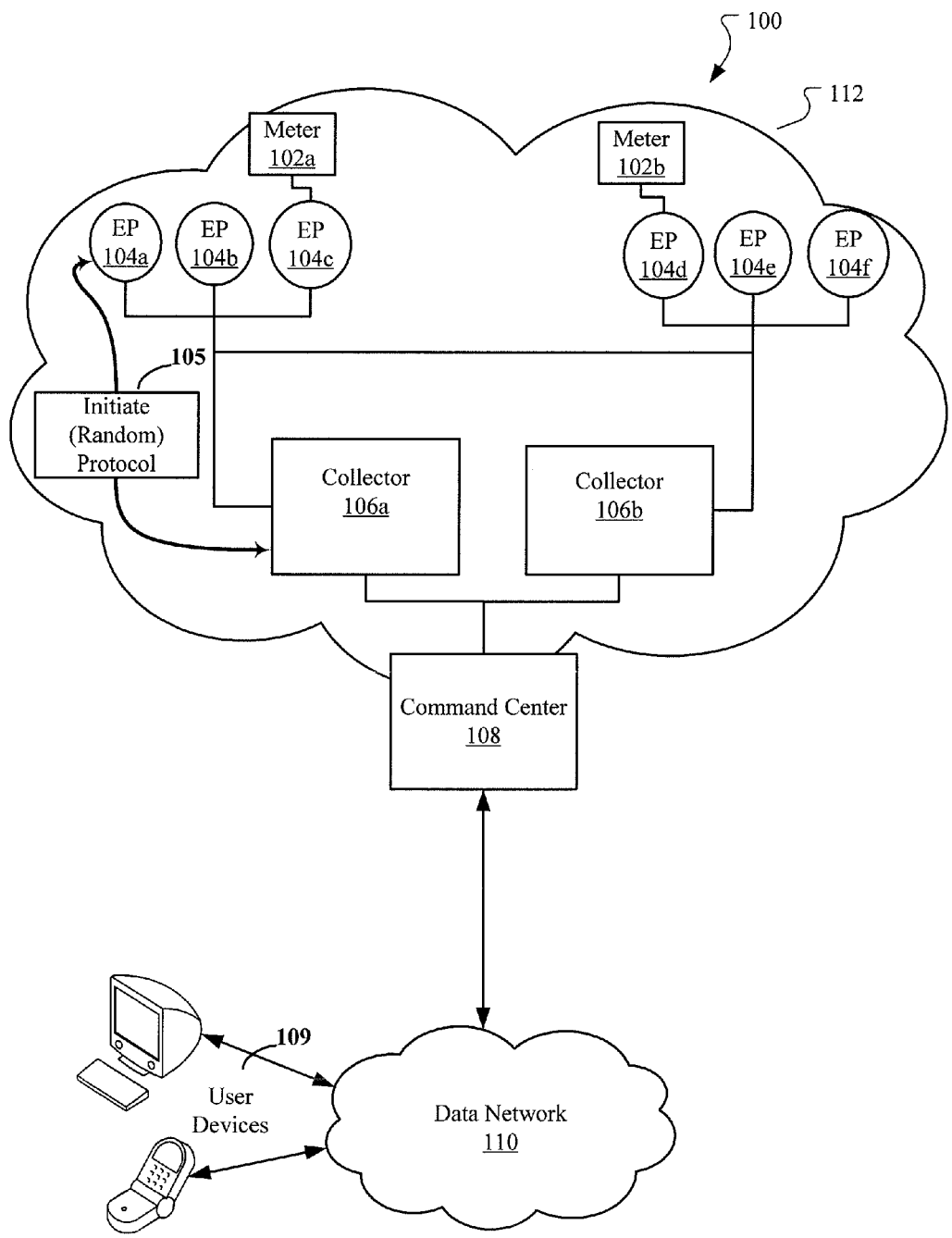
FIG. 1A is a block diagram of an example network environment in which endpoint devices are joined to a power-line communication network, in accordance with one or more embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving initializing endpoint devices with a power-line communication (PLC) network. A power-line communication circuit can detect initiation requests transmitted by other endpoint devices over a power line of the PLC network and revise an initiation time interval of an endpoint device (e.g., a time associated with an endpoint device transmitting an initiation request to begin the initiation process) in response to the detection. In various embodiments, the power-line communication circuit can be configured and arranged as one of a plurality of endpoint devices and/or a collector device.

Consistent with various embodiments, a plurality of endpoint devices can be located at homes, buildings and other locations to which electrical power is distributed. The endpoint devices can communicate with a common collector device using shared power lines (and there can be multiple sets of endpoint devices and collector devices) to initialize with the PLC network. As used herein, a utility power line (e.g., electrical lines) can provide power to multiple power lines. The power lines can include internal electrical lines to a building or location, such as internal electrical lines of consumers, that are arranged with utility power lines to provide power to consumers. For example, utility power lines can be arranged between consumers of power and electric substations associated with a power source generating the power, and configured to provide power to internal electrical lines of the consumers (e.g., within residential and commercial buildings). In some instances, such as adding a new client or geographic region, a plurality of endpoint devices associated with a location and/or different locations may be added to the PLC network at the same time and/or near the same time. Initializing all of the endpoint devices at the same time and/or near the same time can be difficult due to the amount of data traffic used to initialize each of the endpoint devices. This type of communication over power lines and/or utility power lines is a difficult proposition due to, among other problems, the many sources of noise and interference, the presence of alternating current and associated harmonics, the presence of transformers and other impedance varying components, and the variations on impedance seen at different connection points along the power grid. The PLC network may become unstable due to the amount of data traffic, if each of the endpoint devices simultaneously, and/or in an overlapping manner, is initialized with the PLC network.

In some embodiments, a (pseudo) random initiation time interval can be provided for each endpoint device. In some embodiments, each endpoint device can determine its respective random initiation time internal. Alternatively, the collector device can determine the respective random initiation time intervals for a plurality of endpoint devices. With random initiation time intervals, two or more of the endpoint devices may initialize with the PLC network at overlapping times causing data traffic collisions. Accordingly, a power-line communication circuit (of an endpoint device or the collector device) can use a communication protocol to facilitate the initiation of a plurality of the endpoint devices to the PLC network. Aspects of the present disclosure recognize that individual endpoint devices can be designed and configured to initialize with the PLC network by a power-line communication circuit configured and arranged to increase an initial initiation time in response to detecting another endpoint device transmitted an initiation request to the collector device.

According to various example embodiments, aspects of the present disclosure are directed toward a system with distributed endpoint devices that communicate with a collector device over power lines. Each of the endpoint devices and the collector device are electrically connected through shared power lines. Thereby, messages sent from one endpoint device to the collector device and/or the collector device to the one endpoint device, can be observed by the remaining plurality of endpoint devices and the collector device. Particular embodiments are directed to a first power-line communication circuit to communicate data with a second power-line communication circuit over power lines of a PLC network and using a communication protocol requiring that one of the first power-line communication circuit or the second power-line communication circuit join into regular communications in response to an initiation message being recognized as received over the power lines of the PLC network. The communicated data includes meter data collected by at least one of a plurality of endpoint devices.

The first power-line communication circuit can communicate data regularly with the second power-line communication circuit over the power lines after being joined into regular communications by an initiation message being recognized as received over the power lines of the PLC network. For example, the initiation message can be communicated over the power lines at an initiation time interval that is based on a random interval that is within an interval range and that is based on a relative time at which at least two of the plurality of endpoint devices are designated to join within an interval range.

In some embodiments, the relative time can be based on a relative time at which a detected one of the plurality of endpoint devices provided a signal for joining the detected one of the plurality of endpoint device to the PLC network. In such embodiments, the first power-line communication circuit can be one of the plurality of endpoint devices. Further, the second power-line communication circuit can be the collector device configured to collect data from the plurality of endpoint devices and to communicate with a command center over utility power lines that are part of the PLC network. The signal used for joining can include an initiation message detected as being communicated over the power lines on behalf of the detected one of the plurality of endpoint devices.

Alternatively, the relative time can be based on the number of the plurality of endpoint devices in a selected set designated for joining. In such embodiments, the first power-line communication circuit can be the collector device including communication circuitry. Further, the second power-line communication circuit can be one of the plurality of endpoint devices. The number of the plurality of endpoint devices can be greater than two and the random interval can be based on the number.

In some embodiments, the first power-line communication circuit can provide an initiation time interval for an endpoint device, the initiation time interval being based on a random interval within an interval range, and at each of a plurality of message time intervals wherein each is less than the interval range, check for an initiation message received over the PLC network and from another endpoint device. Further, in response to the received initiation message, the first power-line communication circuit can use another initiation time interval that is greater than the provided initiation time interval and based on a time at which the initiation message is received, and transmit, in response to expiration of the another initiation time interval and over the PLC network, a communication to a collector device, the collector device configured and arranged to use the communication as an initiation request for joining the endpoint device to the PLC network.

Particular embodiments are directed to each endpoint device including a metering circuit, a communication circuit, and a processing circuit (e.g., data processing and initiation circuit(s) to initialize the endpoint device with the PLC network). The metering circuit receives utility-meter data for utility-supplied AC power that is provided over a power line that is part of the PLC network. The communication circuit transmits the power meter data and/or initiation request over the power line and the PLC network.

In accordance with some embodiments, the initialization process includes an endpoint device, using a processing circuit, determining an initiation time interval. The initiation time interval, in various embodiments, is based on a random interval from within an interval range. A random interval, as used herein, can include a pseudo random and/or a random determination. Thereby, as used herein, a random initiation time interval can include a pseudo random initiation time interval (e.g., determined pseudo randomly) or a random initiation time interval (e.g., determined randomly). Pseudo random can exhibit statistical randomness while being generated by an entirely deterministic causal process. The endpoint device can detect, prior to the end of the initiation time interval, an initiation request from another endpoint device. The detection can include checking, at a message time interval that is less than the interval range, for a received initiation message over the PLC network. Messages sent by other endpoint devices and/or the collector device to other endpoint devices can be stored by the particular endpoint device in a queue to be checked at the message time interval. The endpoint device, utilizing the processing circuit, adds time to the initiation time interval in response to detecting the initiation request from another endpoint device. The amount added, in various embodiments, can include an increase to the initiation time interval by an amount that is greater than the message time interval. The endpoint device can detect the expiration of the initiation time interval and transmit an initiation request in response to the detected expiration. The initiation request transmitted by the endpoint device is communicated to a collector device over one or more power lines using a data communication channel and can be detected by one of a plurality of other endpoint devices that have not yet initialized. The other endpoint devices can increase their respective initiation time intervals in response to the initiation request.

In some embodiments, a system can include the collector device and the plurality of endpoint devices. The collector device communicates with the plurality of endpoint devices over power lines that are part of a PLC network. Further, the collector device communicates with a command center over a utility power line that is part of the PLC network. Each of the plurality of endpoint devices initializes with the PLC network and provides power-meter reports over the PLC network by transmitting data symbols over the power line using a data communication channel. For example, each endpoint device can initialize with the PLC network by randomly determining an initiation time interval within an interval range and checking, at a message time interval that is less than the interval range, for a received initiation message over the power-line communication network. Further, each endpoint device can increase, in response to receiving the initiation message, the initiation time interval by an amount that is greater than the message time interval, and transmit, in response to expiration of the initiation time interval and over the PLC network, an initiation request to the collector device.

Turning now to the figures, FIG. 1A is a block diagram of an example PLC network environment 100 in which endpoint devices 104 communicate data with collector devices 106, consistent with embodiments of the present disclosure. The PLC network environment 100 includes a service network 112 in which a plurality of endpoint devices 104a-104f are coupled (e.g., communicatively coupled) to collector devices 106a-106b.

In accordance with a number of embodiments, the PLC network can include a standards-based stack (SBS) designed network that utilizes a G3-PLC standard (see, Razazian, K., et al. "G3-PLC specification for powerline communication: Overview, system simulation and field trial results." Power Line Communications and Its Applications (ISPLC), 2010 IEEE International Symposium on. IEEE, 2010, which is fully incorporated herein by reference in its entirety). A G3-PLC network can, for example, be used in buildings, such as a sky-scraper building, among other locations. In various PLC networks, a plurality of endpoint devices and a collector device can be located at a shared location (e.g., a building). The plurality of endpoint devices and collector device can communicate using shared power lines and the collector device can communicate with a command center (as discussed further herein) using a utility power line.

Consistent with embodiments of the present disclosure, the endpoint devices 104 can provide data from utility meters 102a-102b, although other sources of data are equally possible. In some instances, data can be provided from power meters, gas meters and/or water meters, which are respectively installed in gas and water distribution networks. For ease of description the embodiments and examples are sometimes described with reference to endpoint devices 104 as providing utility data (e.g., power) metering over a PLC network and initiation requests. However, the embodiments are not so limited and it is understood that other data can also be communicated by endpoint devices.

Data communication over utility distribution networks (e.g., a PLC network) is difficult due to the environment of the transmission mediums and the sheer number of endpoint devices, which contribute to a host of issues including synchronization, communication bandwidth and cost concerns. For example, data transmitters for power lines must be able to handle high voltages inherently present on the power lines. The PLC network environment 100 shown in FIG. 1A may also exhibit dynamic impedance changes which may make communication difficult due to coupling capacitor degradation, addition and removal of other endpoint devices 104, reconfiguration of the network to balance power loads, reconfiguration of frequency bands assigned to the transmitters, environmental factors, etc. As a result of changes to signal conditions on the power lines, endpoint device communication circuits (e.g., transmitters) may adjust the gain for signals transmitted to collector devices 106.

In accordance with various embodiments, the plurality of endpoint devices 104 can join the PLC network using a communication protocol and without directly coordinating with one another (e.g., no direct communication transmitted between endpoint devices between inputs). The communication protocol, in some embodiments, is associated with a wireless personal area network, such as a low-rate wireless personal area network (e.g., ZigBee, WirelessHART, and MiWi). An example communication protocol can include the Institute of Electrical and Electronic Engineers (IEEE) 802.15.4, although embodiments are not so limited. The communication protocol can include the initiate (random) protocol 105 illustrated by FIG. 1A.

The initiate protocol 105 can be used by a first power-line communication circuit, in various embodiments. The first power-line communication circuit can communicate data with a second power-line communication circuit over power lines of a PLC network and using a communication protocol (e.g., the initiate protocol 105) requiring that one of the first power-line communication circuit or the second power-line communication circuit join into regular communications in response to an initiation message being recognized as received over the power lines. The communicated data can include meter data collected by at least one of a plurality of endpoint devices 104. The first power-line communication circuit can communicate data regularly with the second power-line communication circuit over the power lines after being joined into regular communications by an initiation message being recognized as received over the power lines. The initiation message can be communicated over the power lines at an initiation time interval. The initiation time interval is based on a random interval that is within an interval range and is based on a relative time at which at least two of the plurality of endpoint devices 104 are designated to join within an interval range.

In various embodiments, the first power-line communication circuit is one of the plurality of endpoint devices 104. For example, the relative time at which at least two of the endpoint devices are designated to join within the interval range can be based on a relative time at which a detected one of the plurality of endpoint devices 104 provided a signal used for joining the detected endpoint device to the PLC network. The signal used for joining can be an initiation request detected as being communicated over the power lines on behalf of the detected one of the plurality of endpoint devices 104. As used herein, joining to the PLC network and initiating with the PLC network is used interchangeably. The second power-line communication circuit, in such embodiments, is the collector device 106 including communication circuitry to collect data from the plurality of endpoint devices 104 and to communicate with a command center 108 over utility power lines that are part of the PLC network.

In various embodiments, the first power-line communication circuit that is one of the plurality of endpoint devices 104 can use the initiate (random) protocol 105. The endpoint devices 104 can each be implemented to initialize with the PLC network environment 100 by transmitting initiation requests to the collector devices 106. The initiation request, in various embodiments, can include a beacon request formatted in the communication protocol. In response to receiving an initiation request, the collector device 106 can transmit initiation data over the power lines and the PLC network to the endpoint devices 104, as discussed further herein. The endpoint devices 104 can process the initiation data (e.g., to configure communication channels within the PLC network) and join the PLC network. In various embodiments, the plurality of endpoint devices 104 can attempt to initialize at the same and/or near the same time. To minimize multiple endpoint devices attempting to initialize at overlapping times, each endpoint device 104 can detect initiation messages (e.g., messages associated with an initiation request) transmitted by other endpoint devices over the power line and delay a scheduled initiation time (e.g., add time to a randomly selected initiation time) in response to detecting the initiation messages.

Alternatively, in various embodiments, the first power-line communication circuit is the collector device 106a, 106b. For example, the relative time at which at least two of the endpoint devices 104 are designated to join within the interval can be based on a number of the plurality of endpoint devices 104 in a selected set designated for joining (e.g., attempting). The number, as used herein, is greater than two and the random interval is based on the number. The second power-line communication circuit, in such embodiments, is one of the plurality of endpoint devices 104. To minimize multiple endpoint devices attempting to initialize at overlapping times, the collector device 106a, 106b can provide initiation time intervals for each endpoint device attempting to initialize that are based on a random interval and a number of the endpoint devices designated to join. For example, in such embodiments, the first power-line communication circuit can provide initiation time intervals for each of the endpoint devices designated for joining that spans a larger period of time for a larger number (e.g., 50 endpoint devices) of the plurality of endpoint devices as compared to a period of time for a smaller number (e.g., 10 endpoint devices) of the plurality of endpoint devices.

The endpoint devices 104 can be implemented to monitor and report various operating characteristics of the service network 112. For example, in a power distribution network, meters 102a-102b can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

When the endpoint devices 104 are implemented as power meters in a power distribution network, the power meters transmit reporting data that specify updated meter information that can include measures of total power consumption, power consumption over a specified period of time, peak power consumption, instantaneous voltage, peak voltage, minimum voltage and other measures related to power consumption and power management (e.g., load information). Each of the power meters can also transmit other data, such as status data (e.g., operating in a normal operating mode, emergency power mode, or another state such as a recovery state following a power outage).

In FIG. 1A, endpoint devices 104a-104c and 104d-104f transmit data over power lines to collector devices 106a-106b, respectively. The collector devices 106 can include circuitry (e.g., including one or more data processors and/or digital signal processors (DSPs)) that is configured and arranged to communicate with the endpoint devices over power lines. The collector devices 106 can also include circuitry for interfacing with a command center 108 at a local utility office or other location over a utility power line. The interface to the command center 108 can be implemented using a variety of different communication networks including, but not limited to, a wide-area network (WAN) using Ethernet.

According to certain embodiments of the present disclosure, the collector devices 106 may be installed in building electrical rooms, backs of meters, utility poles, power stations, power substations, transformers, etc. to control bidirectional communication between the command center 108 (e.g., located at a utility office) and endpoint devices 104 (e.g., located at metering locations for customer sites). This messaging to the endpoint devices 104 can be sent to an individual endpoint device, or broadcast simultaneously to a group of endpoint devices or even sent to all endpoint devices connected to the collector devices 106. Consistent with certain embodiments, the collector devices 106 are built according to an industrial-grade computer specification in order to withstand the harsh environment of a substation.

In some embodiments, a collector device 106 may take action based on the data received from the endpoint devices 104 and transmit data received from the endpoint devices 104 to the command center 108. For example, in a PLC network, the command center 108 can receive data indicating that power usage is significantly higher in a particular portion of a power network than in other portions of the power network. Based on this data, the command center 108 can allocate additional resources to that particular portion of the network (i.e., load balance) or provide data specifying that there is increased power usage in the particular portion of the power network.

Consistent with certain embodiments, the command center 108 provides an interface that allows user devices 109 access to data received by the command center 108 via data network 110. For example, the user devices 109 might be owned by operators of a utility-provider, maintenance personnel and/or customers of the utility provider. For example, data identifying the increased power usage described above can be provided to a user device 109, which can, in turn, determine an appropriate action regarding the increased usage. Additionally, data identifying a time-of-use measure and/or a peak demand measure can also be provided to the user devices 109. Similarly, if there has been a power outage, the command center 108 can provide data to user devices 109 that are accessible by customers to provide information regarding the existence of the outage and potentially provide information estimating the duration of the outage.

The data network 110 can be a wide area network (WAN), local area network (LAN), the Internet, or other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

Endpoint device communication circuits may be configured to transmit data over a power line and the PLC network. For example, the communication circuit can transmit data to collector devices 106 using a shared communication channel (e.g., a single communication) and a modulation technique. For example, the PLC network can use a time multiplexed carrier sensed multiple access (CSMA) scheme to control access to the PLC network (e.g., by multiple endpoint devices) using a shared communication channel. In some embodiments, the PLC network includes a time multiplexed orthogonal frequency division multiplexing (OFDM) system that can employ a number of modulation techniques including a robust OFDM (ROBO) and a phase shift keying (PSK, e.g., Quadrature PSK or 8PSK), etc. Encoded data symbols from a particular endpoint device may be transmitted over the communication channel in a PLC network. Channel assignments for the endpoint devices 104a-104c, 104d-104f that communicate with particular collector devices 106a-106b can be stored, for example, in a database that is accessible to the command center 108 and/or the collector devices 106a-106b. The assignment can occur, for example, during initialization of the particular endpoint devices.

Consistent with embodiments of the present disclosure, each collector device 106 can be in communication with a plurality (e.g., one hundred) of endpoint devices 104, and thousands of collector devices 106 can be in connection with the command center 108. For example, a single collector device can be configured to communicate with one hundred endpoint devices and a command center can be configured to communicate with over 1,000 collector devices. Thus, there can be millions of total endpoint devices and one hundred of endpoint devices can communicate to the same collector device over a shared power line. Accordingly, embodiments of the present disclosure are directed toward initializing a plurality of endpoint devices to a PLC network using a communication protocol that is designed for use in this demanding context.

For example, in response to a collector device receiving an initiation message from an endpoint device, the collector device can communicate initiation data over a shared power line and the PLC network to the endpoint device. The communication can include a message indicative of the initiation data that is formatted in the common communication protocol. The communication circuit of the endpoint device can receive the initiation data. The endpoint device can determine if the particular endpoint device transmitted the initiation request (e.g., verify) and, in response to determining the initiation request was transmitted by the endpoint device, process the initiation data and join the PLC network. The initiation data can include configuration data associated with communicating in the PLC network, among other information.

Figure 1B:
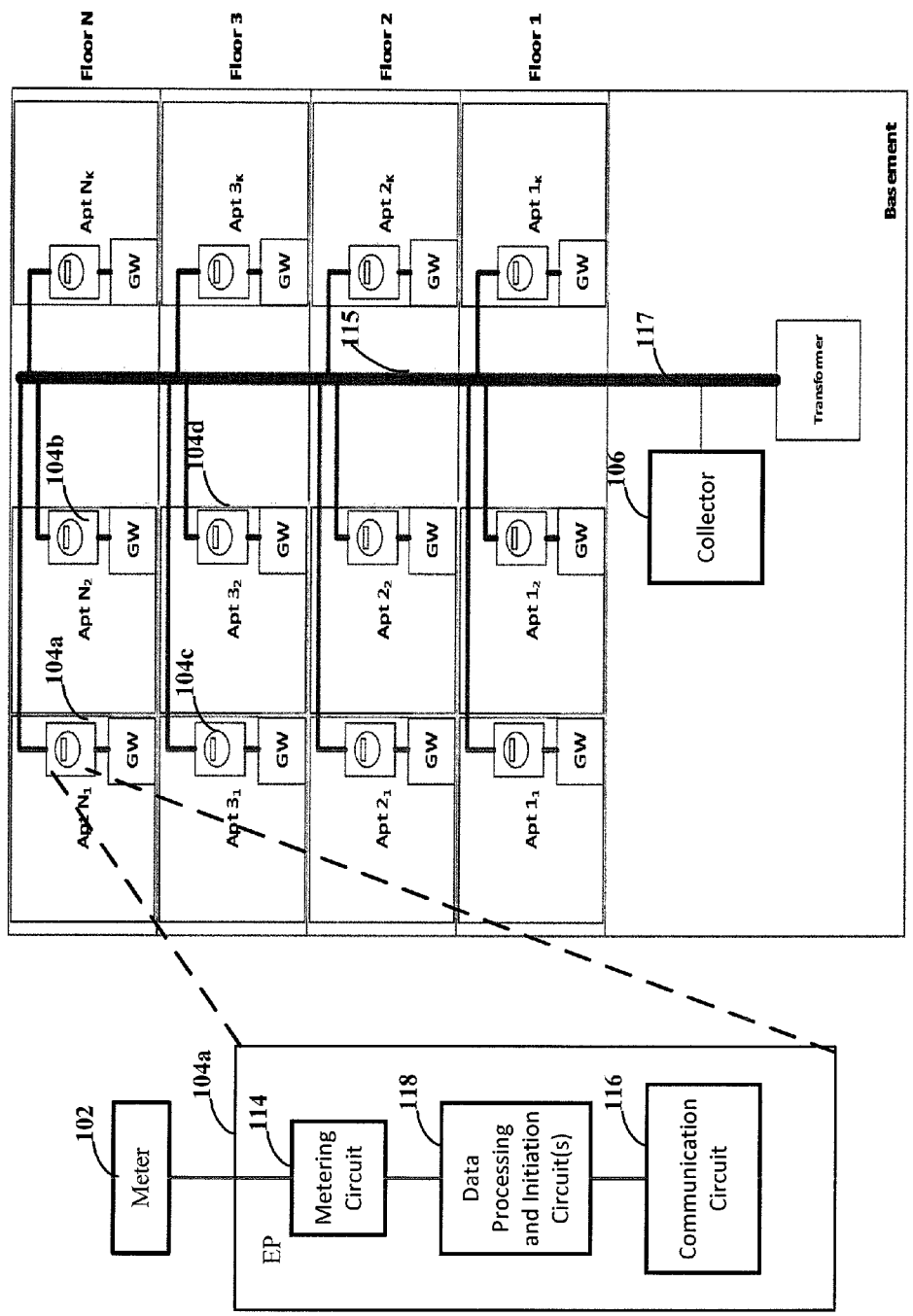
FIG. 1B is a block diagram of an example endpoint device and the network environment, in accordance with one or more embodiments of the present disclosure.

In various embodiments, as illustrated by FIG. 1B, the PLC network can have a mesh-shaped network topology. For example, one or more of the endpoint devices can route messages to the collector device through another endpoint device. Thereby, in some embodiments, a direct communication link from a particular endpoint device to the respective collector device may not exist and/or may not be used (e.g., may exist but not be used). As an example, an endpoint device can transmit the initiation request to a different endpoint device and the different endpoint device can route the initiation request to the collector device using a power line. Further, the collector device, in response to the transmitted initiation request from the endpoint device, can transmit initiation data to the endpoint device using at least another of the plurality of endpoint devices (e.g., the different endpoint device).

For example, the collector device and the plurality of endpoint devices can communicate over the power lines using a radio frequency (RF) communication. The mesh network can allow for communication between many different devices, such as switches, reclosers, capacitor banks, utility meters, etc. The RF communication can allow for message packet routing that can respond to changing network conditions with non-static communication paths. Further, the endpoint devices can prioritize messages to ensure dynamic routing through the network. A spread-spectrum frequency hopping can be used and can allow for multiple endpoint devices to use the same bandwidth, simultaneously transmitting multiple messages and allowing for scalability. For example, message packets can be automatically routed from endpoint device to endpoint device based on geographic address with automatic hopping minimization. Routing can dynamically respond to changing network conditions. For example, a geographic address can be in each endpoint's table, and a message is forwarded as efficiently as possible to its ultimate destination.

FIG. 1B is a block diagram of an example endpoint device and the network environment, in accordance with one or more embodiments. The network environment can include a plurality of endpoint devices 104a, 104b, 104c, 104d and a collector device 106 located in a building. The endpoint device 104 and/or the collector device 106 can communicate over power lines 115. Further, the endpoint device can communicate over a utility power line 117 (e.g., to a command center and/or through a transformer, as illustrated by FIG. 1B).

The endpoint device 104a can provide data (e.g., power-meter reports and initiation requests) over a PLC network by transmitting data symbols over a power line 115 using a data communication channel. Each endpoint device (e.g., the endpoint device 104a) can include a metering circuit 114, a communication circuit 116, and a processing circuit 118 (e.g., data processing and initiation circuit(s)). The metering circuit 114 can receive utility-meter data (e.g., power-meter data) for utility-supplied alternating current (AC) power that is provided over the power line 115 that is part of the PLC network. The metering circuit 114 provides a communication path between a utility meter 102 and the processing circuit 118. For example, the metering circuit 114 can communicate with the utility meter 102 (and/or the processing circuit 118) using wireless or wired communications. The utility-meter data can include monitored characteristics related to power usage in the network including, e.g., average or total power consumption, power surges, power drops and load changes, among other characteristics. In gas and water distribution networks, meters can measure similar characteristics that are related to gas and water usage (e.g., total flow and pressure). Each of the meters can also transmit other data, such as status data (e.g., operating in a normal operating mode, emergency power mode, or another state such as a recovery state following a power outage).

The endpoint devices 104 can be implemented to monitor and report various operating characteristics of the PLC network. The endpoint devices 104 report the operating characteristics of the network over a communication channel. A communication channel is a portion of the spectrum over which data are transmitted. The center frequency and bandwidth of each communication channel can depend on the communications system in which they are implemented. In some implementations, the communication channel for utility meters (e.g., power, gas and/or water meters) can be transmitted using PLC networks that allocate available bandwidth between endpoint devices according to an OFDM spectrum allocation technique or another channel allocation technique.

The communication circuit 116 can transmit the utility-meter data over the power line 115 and the PLC network. For example, the communication circuit 116 can transmit the power-meter data to the collector device 106 over the power line 115 and using a communication channel.

Although FIG. 1B illustrates the endpoint device 104 communicating with the collector device 106 using a direct communication line, e.g., power line 115, embodiments are not so limited. For example, the endpoint device 104*a* can communicate with the collector device 106 by transmitting messages to one or more other endpoint devices (e.g., 104*b*, 104*c*, 104*d*) using the power lines 115. At least one of the other endpoint devices can be in communication with the collector device 106 using the power lines 115 and can communicate the messages from the endpoint device 104*a* to the collector device 106. The endpoint devices can communicate using a RF communication over shared power lines, for example.

The processing circuit 118, as illustrated by FIG. 1B, can include a data processing and initiation circuit(s). The processing circuit 118, in some embodiments, can include a microprocessor that controls the meter circuit 114, the communication circuit 116, and an initiation process. For example, the processing circuit 118 can initialize the endpoint device 104*a* with the PLC network.

Although the present embodiment of FIG. 1B illustrates the processing circuit 118, which includes the initiate circuit, as being located on the endpoint device 104*a*, embodiments in accordance with the present disclosure are not so limited. For example, the processing circuit can be located on the collector device 106. In such embodiments, the collector device 106 can perform the actions and/or operations associated with the initializing endpoint devices to the PLC network (e.g., a first-power line communication circuit) as discussed herein.

In various embodiments, initializing the endpoint device 104*a* with the PLC network can include providing an initiation time interval for the endpoint device 104*a*. For example, in some embodiments, the respective endpoint device 104*a* and/or the collector device 106 can determine the initiation time interval. The initiation time interval can be based on a (pseudo) random interval within an interval range. The interval range can include a predetermined range of time, such as 300 seconds, and the initiation time interval can be within the range. The interval range, in various embodiments, can be the same for each of a plurality of endpoint devices. However, each of the plurality of endpoint devices may not determine its respective initiation time interval at the exact same time. Thereby, while the range is the same for each endpoint device, the range may end at different times for each and/or a subset of the plurality of endpoint devices.

At each of a plurality of message time intervals, the processing circuit 118 can check for an initiation request message from another endpoint device, such as endpoint device 104*b*. The message time intervals can each be less than the interval range. For example, if the interval range is 300 seconds, a message time interval can include 10 seconds. In some embodiments, messages received over the PLC network can be stored in an incoming message queue on the endpoint device 104. The processing circuit 118 can check the incoming message queue at the message time interval to detect an initiation request from another endpoint device. In various embodiments, the processing circuit 118 can periodically check the incoming message queue at each of a plurality of message time intervals. Using the above example, the processing circuit 118 can check the incoming message queue every 10 seconds until the initiation time interval expires.

In response to the received initiation message, the processing circuit 118 can use another initiation time interval that is greater than the provided initiation time interval. The another initiation time interval can be based on a time at which the initiation message is received. For example, the another initiation time interval can include the provided initiation time interval that is increased by an amount of time. An initiation request from another endpoint device can indicate that the another endpoint device is currently communicating with the collector device 106 to initialize with the PLC network. Increasing the time of the initiation time interval of the endpoint device 104*a* can minimize the chance of the initiation process for the endpoint device overlapping with the initiation process for the another endpoint device, and thereby, decrease the risk of network instability as compared to a random time interval for each of the endpoint devices.

The increase in time of the another initiation time interval, in various embodiments, is based on a time associated with initiating another endpoint device. For example, the increase in time (e.g., added time) can be the average amount of time to add to an initiation time interval of an endpoint device (e.g., to provide another initiation time interval) and/or the maximum amount of time to add to initiation time interval an endpoint device, among other times. Alternatively and/or in addition, in various embodiments, the increase in time can include an increase to the initiation time interval by an amount that is greater than the message time interval (e.g., the time interval associated with the processing circuit 118 checking for initiation requests from another endpoint device).

In various embodiments, the processing circuit 118 transmits, in response to expiration of the another initiation time interval and over the PLC network, a communication to the collector device. In some embodiments, the processing circuit 118 detects the expiration of the another initiation time interval. The communication, in some embodiments, can include an initiation request and/or another indication of an endpoint device designated to join the PLC network. For example, the processing circuit 118 can control the communication circuit 116 to transmit the initiation request over the power line 115 to the collector device 106. The collector device 106 uses the communication as an initiation request for joining the endpoint device to the PLC network.

The communication circuit 116 can receive initiation data over the power line 115 and the PLC network in response to the transmitted initiation request. For example, the collector device 106 can transmit the initiation data to the endpoint device 104*a* over the power line 115. The processing circuit 118 of the endpoint device 104 can process the initiation data and join the PLC network using the initiation data, as previously discussed.

In accordance with some embodiments, the processing circuit 118 may detect initiation requests from more than one another endpoint device, such as the remaining endpoint devices 104*c*-104*e*, prior to the expiration of the initiation time interval. For example, the processing circuit 118 can detect a message from a second another endpoint device (e.g., after detecting from the first another endpoint device) and prior to the expiration of the initiation time interval. The processing circuit 118 can add time to the initiation time interval in response to the detection. That is, the processing circuit 118 can periodically repeat detecting an initiation request from a plurality of another endpoint devices and adding, in response to detecting the initiation request from the plurality of another endpoint devices, time to the time interval to revise the time interval until the expiration of the revised time interval. In such embodiments, the processing circuit 118 is configured and arranged as a respective endpoint device.

Figure 2:
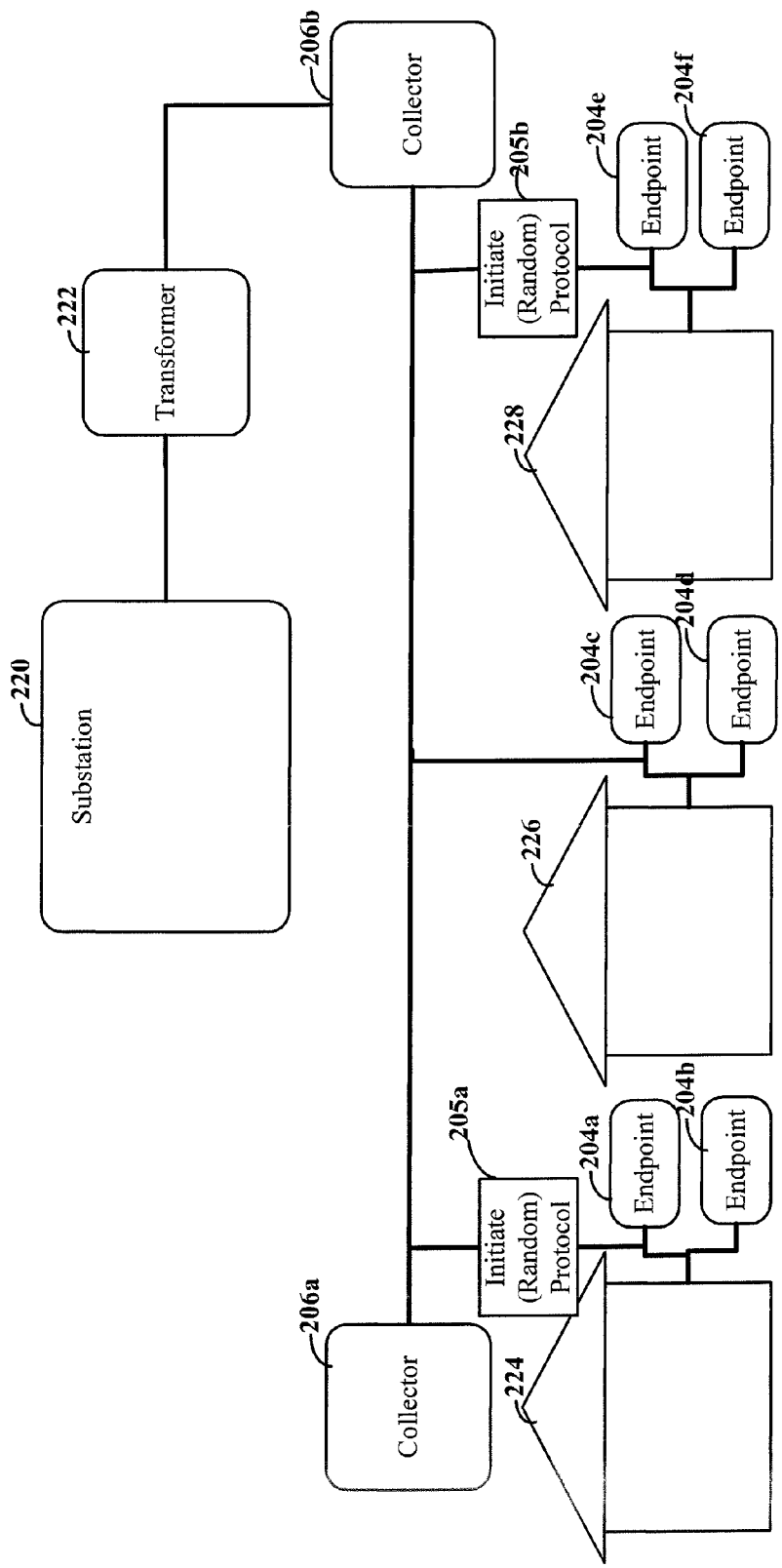
FIG. 2 depicts a system in which a plurality of endpoint devices are located at different locations, in accordance with one or more embodiments of the present disclosure.

FIG. 2 depicts a system in which a plurality of endpoint devices are located at different locations, in accordance with one or more embodiments of the present disclosure. Particular endpoint devices 204a, 204b, 204c, 204d, 204e, 204f are each located at various locations (customer premises) 224, 226 and 228, respectively. Each endpoint device 204a, 204b, 204c, 204d, 204e, 204f can communicate with one or more collector devices 206a, 206b. One or more transformers 222 can be located between the endpoint devices 204a, 204b, 204c and a power substation 220. Moreover, a hundred endpoint devices 204a, 204b, 204c can communicate with a single collector device 206 and therefore the data bandwidth requirements can be significant even without large amounts of data being transmitted from each endpoint.

From the substation, utility power lines are routed to different locations, including various customer premises. In some instances, additional transformer(s) 222 can step down voltage of the provided power for local delivery to such premises.

As illustrated by FIG. 2, in various embodiments, a plurality of endpoint devices 204a, 204b, 204c, 204d, 204e, 204f can be located at each location 224, 226, 228. For example, each location 224, 226 and 228 can include a building, such as a skyscraper building. In some embodiments, a collector can be located at one or more of the locations 224, 226 and 228. For example, a first collector 206a can be located at the first location 224 and can communicate with the endpoint devices 204a, 204b located at the first location 224. Alternatively and/or in addition, a collector can communicate with endpoint devices at multiple locations. For example, a second collector 206b can be associated with the second location 226 and the third location 228. The second collector 206b can be in communication with the endpoint devices 204c, 204d, 204e, and 204f located at the second and third locations 226, 228.

Although the embodiment of FIG. 2 illustrates two endpoint devices at each location, embodiments in accordance with the present disclosure can include fewer or additional endpoint devices at a location. Further, a collector device can be located at each of the locations and can be configured to communicate with endpoint devices at the respective location, in various embodiments.

As illustrated by FIG. 2, in various embodiments, the collector devices 206a. 206b and/or the endpoint devices 204 can use an initiate (random) protocol 205a, 205b to join the endpoint devices 204 to the PLC network. For example, as previously discussed, a first power-line communication circuit can use the initiate (random) protocol 205a, 205b. In various embodiments, the first power-line communication circuit is the collector devices 206a, 206b. Alternatively, each of the endpoint devices 204 can include a first power-line communication circuit.

Aspects of the present disclosure are directed toward endpoint devices 204a, 204b, 204c being configured and arranged with processing circuitry that allows for initialization of a plurality of endpoint devices to the PLC network at the same and/or near the same time. Each endpoint device 204a, 204b, 204c, in various embodiments, can check for initiation messages transmitted by another endpoint device and increase time to their random initiation time interval (e.g., the initiation time interval based on the random interval within the interval range) until expiration of the increased initiation time interval is reached. As further illustrated by the timing diagram illustrated by FIG. 4, assuming all endpoint devices are provided and/or determine the initiation time interval at the same time, a time associated with initiating each of the plurality of endpoint devices 204a, 204b, 204c is associated with a function of the number of endpoint devices (e.g., three endpoint devices illustrated in FIG. 2) being initiated and a time to initiate one of the endpoint devices.

Other aspects of the present disclosure are directed toward the collector devices 206a, 206b being configured and arranged with processing circuitry that allows for initialization of a plurality of endpoint devices to the PLC network at the same and/or near the same time. For example, particular collector device 206a can provide an initiation time interval to a particular endpoint device 204a. The initiation time interval is based on a random interval that is within an interval range and based on a relative time at which at least two of the plurality of endpoint devices are designated to join within an interval range. For example, the relative time can be based on a number of the plurality of endpoint devices in a selected set designated for joining. Alternatively and/or in addition, the collector device 206a can check for initiation messages transmitted by another endpoint device and increase time to the initiation time interval of the endpoint device 204a in response to the initiation message, until expiration of the increased time interval.

Figure 3:
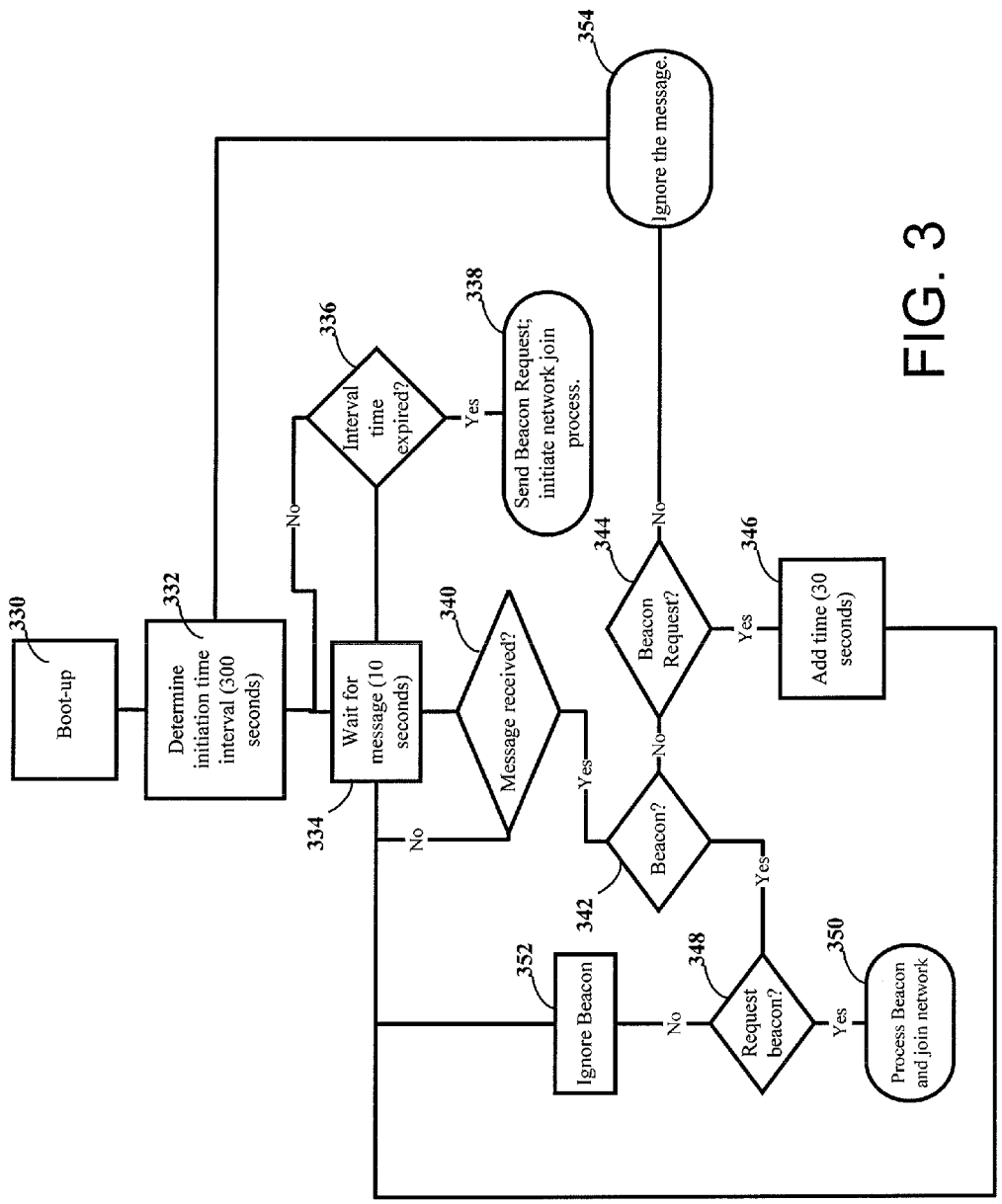
FIG. 3 is a flow chart depicting a process for initializing an endpoint device to join a power-line communication network, in accordance with one or more embodiments of the present disclosure.

FIG. 3 is a flow chart depicting a process for initializing an endpoint device to join a PLC network, in accordance with one or more embodiments. At block 330, the endpoint device (e.g., the communication circuitry) boot-up. At block 332, an initiation time interval is provided to the endpoint device. The initiation time interval, in various embodiments, is associated with a time for IEEE 802.15.4-2006 beacon requests. The initiation time interval, in various embodiments, can include an initiation time interval based on a random interval within an interval range (e.g., 300 seconds).

At block 334, the endpoint device waits for a received message. The wait, in various embodiments, includes waiting for a message time interval. For example, the endpoint device can check for a received initiation message at expiration of a message time interval that is less than the interval range. The received messages can be stored in an incoming message queue.

At block 336, the endpoint device can determine if the initiation time interval has expired. In response to determining the initiation time interval has not expired, the endpoint device can wait for received messages at block 334 until expiration of the initiation time interval. In response to the initiation time interval expiring, at block 338, the endpoint device transmits an initiation request to initiate the network joining process.

At block 340, the endpoint device determines if a message was received (e.g., at a physical layer of the PLC network). If no message has been received, the endpoint device waits for incoming messages at block 334 until expiration of the initiation time interval.

In response to receiving a message at the physical layer, at block 342, the endpoint device determines if the message is indicative of initiation data transmitted from a collector device and/or another endpoint device. The message can be formatted in a communication protocol (e.g., as a beacon). If the message is indicative of initiation data, at block 348, endpoint device determines if an initiation request was transmitted by the endpoint device. In response to determining the endpoint device transmitted the initiation request, at block 350, the endpoint device can process the initiation data and join the PLC network. In response to determining the endpoint device did not transmit the initiation request, at block 352, the endpoint device (e.g., the processing circuit) can ignore the initiation data.

In response to determining the message is not indicative of initiation data, at block 344, the endpoint device can determine if the message includes an initiation request from another endpoint device (e.g., an initiation message). At block 346, in response to the message including the initiation request, the endpoint device adds time to the initiation time interval and waits for incoming messages at block 334 until expiration of the initiation time interval. In response to the message not including an initiation request, at block 354, the endpoint device can ignore the message.

That is, in some embodiments, a processing circuit of the endpoint device can detect, prior to expiration of the initiation time interval, a message from a different endpoint device and/or the collector device and ignore the message in response to the message not including an initiation request and/or a message associated with initiation data. In some embodiments, an error may have occurred and the endpoint device can determine a new random initiation time interval, at block 332.

Although the example embodiment of FIG. 3 illustrates an endpoint device performingthe actions and/or operations, embodiments in accordance with the present disclosure are not solimited. For example, another device, such as the collector device, can include a first power-line communication circuit and can perform the various actions and/or operations as described. For example, a method embodiment can include providing an initiation time interval, the initiation time interval being based on a random interval within an interval range, and at each of a plurality of message time intervals wherein each is less than the interval range, checking for an initiation message received over the PLC network and from another endpoint device. Further, the method can include, in response to the received initiation message, using another initiation time interval that is greater than the provided initiation time interval and based on a time at which the initiation message is received, and transmitting, in response to expiration of the initiation time interval and over the PLC network, a communication to a collector device, the collector device configured to use the communication as an initiation request for joining the endpoint device in communication with other endpoint devices over the power lines.

In some embodiments, the method can include joining each of the endpoint devices to the PLC network using initiation data received by the endpoint device from the collector device. The initiation data can be sent in response to the initiation request. Further, transmitting the initiation request to the collector device can include the endpoint device transmitting the initiation request to a different endpoint device, in some embodiments, and the method further includes the different endpoint device routing the initiation request to the collector device using the power lines.

Figure 4:
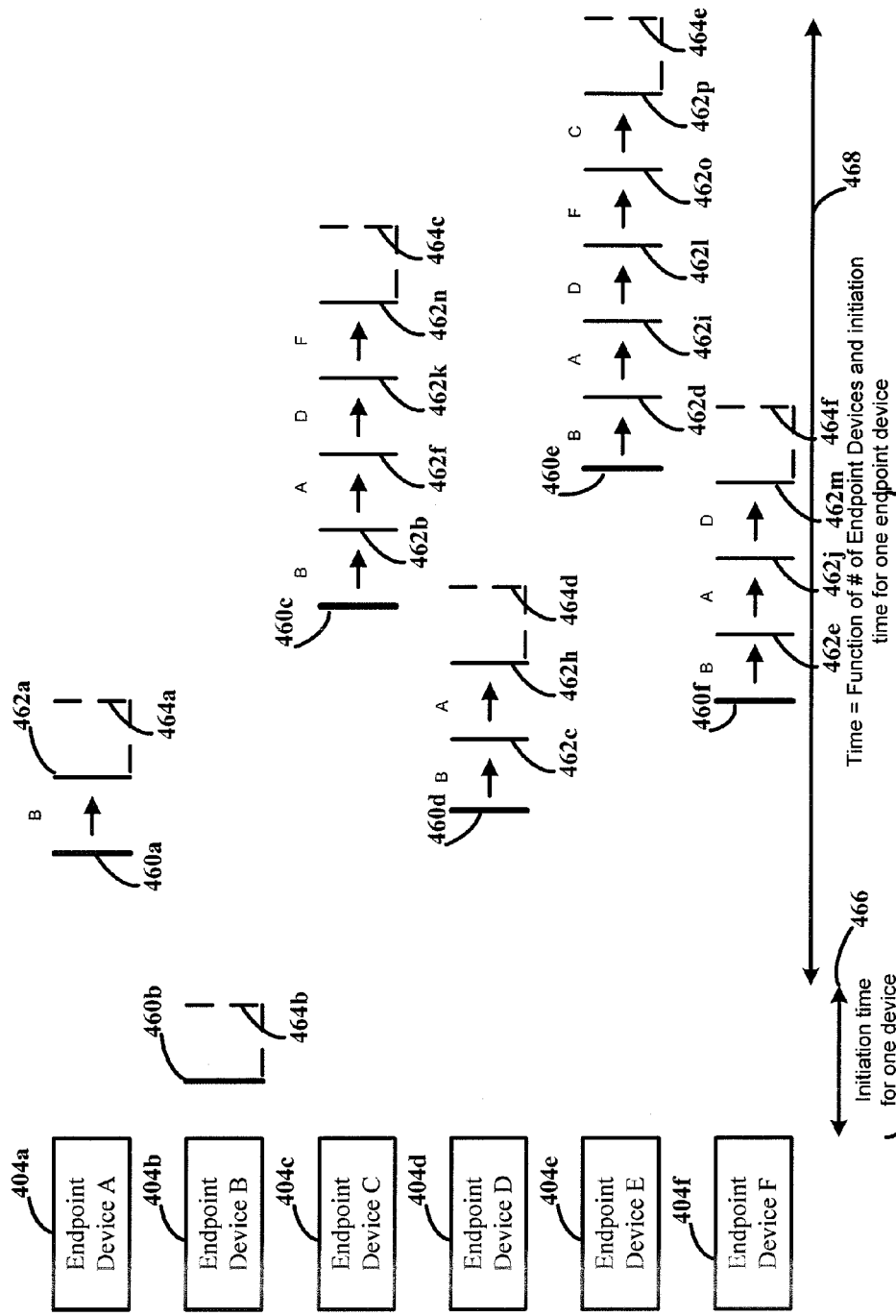
FIG. 4 is an example timing diagram for joining a plurality of endpoint devices to a power-line communication network, in accordance with one or more embodiments of the present disclosure.

FIG. 4 is an example timing diagram for initializing a plurality of endpoint devices 404a, 404b, 404c, 404d, 404e, 404f to join a PLC network. As illustrated by the timing diagram, each of the plurality of endpoint devices randomly determines an initiation time interval 460a, 460b, 460c, 460d, 460e, 460f within an interval range 470. Assuming each of the endpoint devices 404 determine an initiation time interval at the same time, the interval range 470 of each endpoint device is the same point in time. For ease of discussion, it is assumed that each endpoint device 404 determines the initiation time interval at the same time. However, embodiments are not so limited and can include embodiments in which the endpoint devices determine the initiation time interval at/near the same time and/or within a range of time.

One of the plurality of endpoint devices, endpoint device B 404b, has an initiation time interval 460b that is earliest in time as compared to the initiation time intervals of the remaining endpoint devices. As such, endpoint device B 404b may not detect an initiation message and, in some embodiments, may transmit an initiation request to the collector device over a power line at the expiration of the randomly determined initiation time interval 460b. Sending the initiation request to the collector device can include a beginning of the initiation process for the endpoint device B 404b. Completion of the initiation process 464b for endpoint device B 404b can occur upon endpoint device B 404b processing initiation data transmitted by the collector device and joining the PLC network. The remaining endpoint devices are electrically connected to the shared power line and can detect the initiation request transmitted by endpoint device B 404b. In response to detecting the initiation request, the remaining endpoint devices can add time to their respective random initiation time intervals. As an example, endpoint device A 404A can add time to its random initiation time interval 460a, as illustrated by the arrow, to revise the initiation time interval 462a. The time added can include an increase in time by an amount that is greater than the message time interval. Similarly, endpoint device C 404c, endpoint device D 404d, endpoint device E 404e, and endpoint device F 404f can add time to their random initiation time intervals 460c, 460d, 460e, 460f to revise the initiation time interval 462b, 462c, 462d, and 462e.

This process can continue for each endpoint device until the expiration of the initiation time interval without detection of an additional initiation request. For example, endpoint device A 404a may not detect an initiation request subsequent to the initiation request transmitted by endpoint device B 404b. At the expiration of the revised initiation time interval 462a, endpoint device A 404a can transmit an initiation request to the collector device over the utility power line (e.g., to begin the initiation process). Endpoint device A 404a can complete the initiation process 464a by processing initiation data transmitted by the collector device and joining the PLC network. The remaining endpoint devices can detect the initiation request transmitted by endpoint device A 404a and add time to their respective random initiation time intervals. This can continue, including respective endpoint devices adding time to revise the initiation time intervals (e.g., 462f, 462k, 462i, 462l, 462o, 462j), until each of the endpoint devices reach the expiration of the revised initiation time intervals (e.g., 462n, 462h, 462p, and 462m), begin the initiation process (e.g., transmit an initiation request to the collector device), and complete the initiation process (e.g., 464c, 464d, 464e, 464f).

As illustrated by FIG. 4, the total time 468 taken to initialize the plurality of endpoint devices 404 to the PLC network can be associated with a function of the number of endpoint devices and an initiation time for one endpoint device 466. Assuming the endpoint devices are all booted up at the same time and no additional issues occur, the maximum time to initialize the endpoint devices is a function of the number of endpoint devices times the initiation time plus the interval range 470 (e.g., function of (# endpoint devices×time for initializing one device)+interval range)). Of course it is contemplated that the endpoint devices may not be booted up at the exact same time, that initialization may overlap between some of the endpoint devices resulting in delay, and other issues may arise that cause additional time to initialize the endpoint devices.

Various blocks, modules or other circuits may be implemented to carry out one or more of the operations and activities described herein and/or shown in the figures. For example, in various embodiments, although not illustrated or discussed by FIG. 4, the collector device can perform the various operations and activities. In these contexts, the figures and description use various circuit-representative terms such as endpoint device, collector device and other circuit-based terms. In the power-line communications contexts disclosed herein, each of collector device and endpoint device refers to a circuit that is coupled to the power lines which is part of the power-line communications network, wherein endpoint device refers to a circuit located at a facility drawing power from the power lines (and typically providing power-metering activities) and collector device refers to a circuit remote from and communicatively coupled to such endpoint devices with the typical role of collecting data indicative of the power-meter data provided by the endpoint devices. Also, in the figures, for instance, a "block" (also sometimes "logic circuitry" or "module") is a circuit depicted to carry out one or more of these or related operations/activities (e.g., determine initiation time intervals, detect initiation requests, or add time to the initiation time interval). For example, in certain of the above-discussed embodiments, one or more modules are discrete logic circuits or programmable logic circuits configured and arranged for implementing these operations/activities, as in the circuit modules shown in FIG. 1B. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Similarly, the term random is used in contexts herein so as to be recognized to encompass and/or as being the same as pseudo-random.

Certain embodiments are directed to a computer program product (e.g., nonvolatile memory device), which includes a machine or computer-readable medium having stored thereon instructions which may be executed by a computer (or other electronic device) to perform these operations/activities.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features of another figure even though the combination is not explicitly shown or explicitly described as a combination. It is intended that the specification and illustrated embodiments be considered as examples only, with a true scope of the invention being indicated by the following claims.

What is claimed is:

1. An apparatus comprising:
a first power-line communication circuit configured and arranged to communicate data with a second power-line communication circuit over power lines of a power-line communication network and using a communication protocol requiring that one of the first power-line communication circuit or the second power-line communication circuit join into regular communications in response to an initiation message being recognized as received over the power lines of the power-line communication network, the communicated data including power-meter data collected by at least one of a plurality of endpoint devices;
the first power-line communication circuit being further configured and arranged to communicate data regularly with the second power-line communication circuit over the power lines after being joined into regular communications by the initiation message being recognized as received over the power lines of the power-line communication network, the initiation message being communicated over the power lines at an initiation time interval, the initiation time interval being based on a random interval that is within an interval range and that is based on a relative time at which at least two of the plurality of endpoint devices are designated to join within the interval range.

2. The apparatus of claim 1, wherein the relative time at which at least two of the plurality of endpoint devices are designated to join within the interval range is based on a relative time at which a detected one of the plurality of endpoint devices provided a signal used for joining the detected one of the plurality of endpoint devices.

3. The apparatus of claim 1, wherein the first power-line communication circuit is one of the plurality of endpoint devices, and the relative time at which at least two of the plurality of endpoint devices are designated to join within the interval range is based on a relative time at which a detected one of the plurality of endpoint devices provided a signal used for joining the detected one of the plurality of endpoint devices.

4. The apparatus of claim 1, wherein the first power-line communication circuit is one of the plurality of endpoint devices and further including the second power-line communication circuit, wherein the second power-line communication circuit is configured and arranged to collect data from the plurality of endpoint devices and to communicate with a command center over utility power lines that are part of the power-line communication network, and the relative time at which at least two of the plurality of endpoint devices are designated to join within the interval range is based on a relative time at which a detected one of the plurality of endpoint devices provided a signal used for joining the detected one of the plurality of endpoint devices.

5. The apparatus of claim 1, wherein the relative time at which at least two of the plurality of endpoint devices are designated to join within the interval range is based on a number of the plurality of endpoint devices in a selected set designated for joining.

6. The apparatus of claim 1, wherein the first power-line communication circuit is a collector device including communication circuitry, and wherein the relative time at which at least two of the plurality of endpoint devices are designated to join within the interval range is based on a number of the plurality of endpoint devices in a selected set designated for joining.

7. The apparatus of claim 1, wherein the first power-line communication circuit is a collector device including communication circuitry, and further including the second power-line communication circuit, wherein the second power-line communication circuit is configured and arranged as one of the plurality of endpoint devices, and wherein the relative time at which at least two of the plurality of endpoint devices are designated to join within the interval range is based on a number of the plurality of endpoint devices in a selected set designated for joining.

8. The apparatus of claim 1, wherein the relative time at which at leasttwo of the plurality of endpoint devices are designated to join within the interval range is based on a relative time at which a detected one of the plurality of endpoint devices provided a signal used for joining the detected one of the plurality of endpoint devices, wherein the signal used for joining is the initiation message detected as being communicated over the power lines on behalf of the detected one of the plurality of endpoint devices.

9. The apparatus of claim 1, wherein the relative time at which at least two of the plurality of endpoint devices are designated to join within an interval range is based on a number of the plurality of endpoint devices in a selected set designated for joining, wherein the number is greater than two and wherein the random interval is based on the number.

10. An apparatus comprising:
a first power-line communication circuit configured and arranged to communicate data with a second power-line communication circuit over power lines of a power-line communication network and using a communication protocol requiring that one of the first power-line communication circuit or the second power-line communication circuit join into regular communications in response to an initiation message being recognized as received over the power lines of the power-line communication network, the communicated data including power-meter data collected by at least one of a plurality of endpoint devices, wherein the first power-line communication circuit is configured and arranged to:
provide an initiation time interval for an endpoint device, the initiation time interval being based on a random interval within an interval range;
at each of a plurality of message time intervals wherein each is less than the interval range, check for the initiation message received over the power-line communication network and from another endpoint device;
in response to the received initiation message, using another initiation time interval that is greater than the provided initiation time interval and based on a time at which the initiation message is received; and
transmit, in response to expiration of the another initiation time interval and over the power-line communication network, a communication to a collector device, the collector device configured and arranged to use the communication as an initiation request for joining the endpoint device to the power-line communication network.

11. The apparatus of claim 10, wherein the first power-line communication circuit is one of the plurality of endpoint devices, and wherein each of the plurality of endpoint devices are configured and arranged to join the power-line communication network using the communication protocol and without directly coordinating with one another, and wherein the communication protocol is associated with a wireless personal area network and the plurality of endpoint devices are configured to communicate with the collector device using shared power lines.

12. The apparatus of claim 10, wherein the first power-line communication circuit is one of the plurality of endpoint devices, further including the second power-line communication circuit, wherein the second power-line communication circuit is configured and arranged as the collector device including communication circuitry configured and arranged to transmit initiation data over the power line and the power-line communication network in response to the communication, and wherein each of the plurality of endpoint devices is configured and arranged to process initiation data from the collector device in response to verifying the respective endpoint device transmitted the communication.

13. The apparatus of claim 10, wherein the first power-line communication circuit is the collector device including communication circuitry configured and arranged to communicate with the plurality of endpoint devices and communicate with a command center over a utility power line that is part of the power-line communication network, and wherein a time associated with initiating the plurality of endpoint devices is associated with a function of the number of endpoint devices being initiated and a time to initiate one of the endpoint devices.

14. The apparatus of claim 10, wherein the collector device, in response to the communication, transmits initiation data to one of the plurality of endpoint devices using at least another of the plurality of endpoint devices.

15. A method for initializing an endpoint device with a power-line communication network, the endpoint device configured and arranged to provide power-meter reports over the power-line communication network by transmitting data symbols over power lines using a data communication channel, the method including:
providing an initiation time interval, the initiation time interval being based on a random interval within an interval range;
at each of a plurality of message time intervals wherein each is less than the interval range, checking for an initiation message received over the power-line communication network and from another endpoint device;
in response to the received initiation message, use another initiation time interval that is greater than the provided initiation time interval and based on a time at which the initiation message is received; and
transmitting, in response to expiration of the initiation time interval and over the power-line communication network, a communication to a collector device, the collector device configured to use the communication as an initiation request for joining the endpoint device in communication with other endpoint devices over the power lines.

16. The method of claim 15, further including joining each of the endpoint devices to the power-line communication network using initiation data received by the endpoint device from the collector device, the initiation data sent in response to the initiation request, and wherein transmitting the initiation request to the collector device includes the endpoint device transmitting the initiation request to a different endpoint device and the method further includes the different endpoint device routing the initiation request to the collector device using the power lines.

17. An endpoint device configured to provide power-meter reports over a power-line communication network by transmitting data symbols over a power line using a data communication channel comprising:

a metering circuit configured to receive power-meter data for utility-supplied alternating current (AC) power that is provided over the power line that is part of the power-line communication network;

a communication circuit configured to transmit the power-meter data over the power line and the power-line communication network;

a processing circuit configured to initialize the endpoint device with the power-line communication network by:
  determining an initiation time interval associated with the endpoint device;
  detecting, prior to the expiration of the initiation time interval, an initiation request from another endpoint device;
  adding, in response to detecting the initiation request from the another endpoint device, time to the initiation time interval;
  detecting the expiration of the initiation time interval; and
  transmitting, in response to detecting the expiration of the initiation time interval, an initiation request.

18. The device of claim 17, wherein the communication circuit is configured to receive initiation data over the power line and the power-line communication network in response to the transmitted initiation request, and wherein the processing circuit is configured to process the initiation data and join the power-line communication network in response to determining the endpoint device transmitted the initiation request, and further configured to ignore the initiation data in response to determining the endpoint device did not transmit the initiation request.

19. The device of claim 17, wherein the processing circuit is configured to periodically repeat detecting, prior to the expiration of the initiation time interval, an initiation request from a plurality of another endpoint devices and adding, in response to detecting the initiation request from the plurality of another endpoint devices, time to the initiation time interval to revise the initiation time interval until the expiration of the revised initiation time interval.

20. The apparatus of claim 1, wherein the power lines include internal electrical lines of a location, the power lines being configured and arranged with a utility power line to provide power between consumers of the power and electrical substations associated with a power source generating the power, and wherein the initiation message includes beacon requests formatted in a common communication protocol.

* * * * *